(12) United States Patent
Shao et al.

(10) Patent No.: US 7,080,549 B2
(45) Date of Patent: Jul. 25, 2006

(54) THROTTLE POSITION SENSOR

(75) Inventors: Liang Shao, Ann Arbor, MI (US); Shigeru Oho, Farmington Hills, MI (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/284,329

(22) Filed: Nov. 21, 2005

(65) Prior Publication Data

US 2006/0075809 A1    Apr. 13, 2006

Related U.S. Application Data

(63) Continuation of application No. 10/733,913, filed on Dec. 11, 2003, now abandoned.

(51) Int. Cl.
*G01M 15/00* (2006.01)
(52) U.S. Cl. .................................... 73/118.2
(58) Field of Classification Search ............... 73/116, 73/117.2, 117.3, 118.1, 118.2, 119 R
See application file for complete search history.

(56) References Cited

U.S. PATENT DOCUMENTS

| | | | |
|---|---|---|---|
| 4,616,504 A | 10/1986 | Overcash et al. | 73/118.1 |
| 4,679,440 A | 7/1987 | Okamura | 73/118.1 |
| 4,920,939 A | 5/1990 | Gale | 123/399 |
| 5,056,022 A | 10/1991 | Witkowski et al. | 364/424.1 |
| 5,070,728 A | 12/1991 | Kubota et al. | 73/118.1 |
| 5,289,134 A | 2/1994 | Kohr | 324/549 |
| 5,321,980 A | 6/1994 | Hering et al. | 73/118.1 |
| 5,339,782 A | 8/1994 | Goelzer et al. | 123/399 |
| 5,394,341 A | 2/1995 | Kepner | 364/551.01 |
| 5,743,132 A | 4/1998 | Hosoya et al. | 73/118.2 |
| 6,075,371 A | 6/2000 | Kitamura | 324/716 |
| 6,250,292 B1 | 6/2001 | Suhre | 123/688 |
| 6,491,023 B1 | 12/2002 | Lippa | 123/399 |
| 6,651,621 B1 | 11/2003 | Farmer et al. | 123/396 |
| 6,691,678 B1 | 2/2004 | Hashimoto et al. | 123/399 |
| 6,832,511 B1 | 12/2004 | Samoto et al. | 73/118.1 |
| 2001/0035158 A1 | 11/2001 | Lippa | 123/399 |
| 2002/0170534 A1 | 11/2002 | Lippa | 123/399 |

FOREIGN PATENT DOCUMENTS

| | | |
|---|---|---|
| DE | 3 522 775 | 6/1985 |
| EP | 0 354 269 | 9/1985 |
| JP | 08 029113 | 2/1996 |

*Primary Examiner*—Eric S. McCall
(74) *Attorney, Agent, or Firm*—Gifford, Krass, Groh, Sprinkle, Anderson & Citkowski, P.C.

(57) ABSTRACT

A throttle position sensor for a throttle having a movable throttle element. The sensor includes an elongated electrically resistive strip having a first and second end. The first end of the strip is connected to a first voltage potential while the second end is electrically connected to a second voltage potential different from the first. An electrically conductive wiper is in sliding contact with the resistive strip. The wiper and resistive strip are relative to each other and one of the wiper or resistive strip is connected to the movable throttle element. Consequently, the position of the wiper relative to the strip varies proportionally with the position of the throttle element so that a voltage output from the wiper varies proportionally with the position of the movable throttle element. A circuit is associated with the sensor which determines the contact resistance between the wiper and the strip.

26 Claims, 3 Drawing Sheets

THROTTLE POSITION SENSOR

RELATED APPLICATION

This application is a continuation of U.S. patent application Ser. No. 10/733,913 filed Dec. 11, 2003 now abandoned.

BACKGROUND OF THE INVENTION

I. Field of the Invention

The present invention relates to a throttle position sensor for an electronic throttle.

II. Description of Related Art

There are many previously known electronic throttles, also known as throttle by wire, of the type used in automotive engines. These previously known electronic throttles typically include a DC servo drive which moves a throttle element to control the airflow into the intake manifold of the engine. Such electronic throttles enjoy a number of advantages.

For example, with an electronic throttle control, the engine electronic control unit, typically a microprocessor, can be programmed to include traction control, cruise control and turbo anti-lag without additional hardware costs. Furthermore, since the actual throttle opening is controlled by the electronic control unit for the engine, by simple programming, the electronic control unit can be programmed to control the position of the throttle to minimize engine emissions, maximize engine economy, as well as controlling other aspects of the vehicle engine operation.

Such electronic throttles typically include a throttle position sensor which provides a feedback signal to the electronic control unit for the engine indicative of the precise position of the movable throttle element which controls the airflow to the intake manifold, typically a throttle plate. These previously known throttle position sensors typically comprise an elongated resistive strip having a first end and a second end. The strip may be either linear or, more commonly, arranged in a circular pattern.

A first voltage potential is electrically connected to the first end of the resistive strip while a second and different voltage potential, typically ground, is electrically connected to the second end of the resistive strip. An elongated wiper is then mechanically connected to the movable throttle element, i.e. the throttle plate, so that the point of contact between the wiper and the resistive strip varies as a function at the degree of opening of the throttle plate. Consequently, the voltage potential of the wiper varies proportionally with the position of the wiper relative to the resistive strip.

Ideally, the voltage output signal from the wiper varies linearly as the wiper moves from the first and towards the second end of the resistive strip. However, in practice, the previously known throttle position sensors do not exhibit such linearity, particularly after extended use of the throttle position sensor.

For example, in some cases the resistive strip becomes pitted or otherwise damaged on its surface. When this occurs, the desired constant contact between the wiper and the resistive strip is not maintained when the wiper moves across the damaged portion of the resistive strip. Instead, the contact resistance between the wiper and the resistive strip typically increases dramatically and results in a false voltage output reading on the wiper and thus from the sensor. Such a false output reading is then interpreted by the electronic control unit as an incorrect throttle opening position.

A still further problem with throttle position sensors is that the resistance of the resistive strip may change after extended use. When this occurs, improper engine operation can result.

Similarly, in some cases the wiper may become damaged or its attachment to the throttle position sensor damaged or loosened. When this occurs, in a manner similar to a damaged resistive strip, the contact resistance between the wiper and the resistive strip can vary widely thus providing a false output signal from the sensor as to the actual position of the throttle plate.

An incorrect output signal from the throttle position sensor due to a sudden increase of the contact resistance between the wiper and the resistive strip in many cases adversely affects the overall operation of the engine. For example, such inaccurate output signals from the throttle position sensor can result in hunting by the electronic throttle which eventually can cause some malfunction error codes. This adversely affects proper engine performance and, in some cases, can even adversely affect engine emissions and economy.

There have been no previously known throttle position sensors with circuitry capable of monitoring the contact resistance between the wiper and the resistive strip and/or compensating for incorrect outputs from the throttle position sensor.

SUMMARY OF THE PRESENT INVENTION

The present invention provides a throttle position sensor which overcomes all the above-mentioned disadvantages of the previously known devices.

In brief, the throttle position sensor of the present invention is designed for use with an electronic throttle having a movable throttle element, typically a movable throttle plate. A servo motor is mechanically connected to the movable throttle element while an electronic control unit (ECU) for the engine controls the activation of the servo motor.

The throttle position sensor of the present invention includes an elongated electrically resistive strip having a first end and a second end. The elongated strip may be linear but, more typically, is arranged in a circular pattern. A voltage source at a first potential is electrically connected to a first end of the resistive strip while, similarly, the second end of the resistive strip is maintained at a second voltage potential, typically ground.

As with the previously known throttle position sensors, an electrically conductive wiper is in sliding contact with the resistive strip. Either the resistive strip or the wiper is mechanically connected to the movable throttle element or throttle plate so that the position of the wiper relative to the resistive strip varies proportionally with the opening of the throttle plate. Consequently, assuming that the contact resistance between the wiper and the resistive strip remains constant or within some predetermined range, the voltage output from the wiper is proportional to the degree of throttle opening. This wiper output is connected as an electrical input signal to the ECU for the engine.

Unlike the previously known throttle position sensors, the throttle position sensor of the present invention includes circuitry to both monitor and determine the contact resistance between the wiper and the resistive strip. By thus monitoring the contact resistance between the wiper and the resistive strip, the output signal from the throttle position sensor may be either corrected by the ECU using prediction algorithms or, in extreme cases representing a failure of the throttle position sensor, generate an appropriate alarm signal to the engine operator.

Although the contact resistance monitoring circuit may take any of several forms, in the preferred embodiment of the invention, a sensor resistance of a predetermined resistance is selectively connected by a first switch between the wiper and the second voltage potential, typically ground. A first voltage detector or buffer then generates an output signal representative of the voltage drop across the sensor resistor.

Simultaneously, a second voltage detector or buffer generates an output signal representative of the voltage drop between the first end of the resistive strip and the wiper. In the preferred embodiment of the invention, a high impedance input of a buffer is selectively electrically connected in series with the second end of the resistive strip. By doing so, current flow along the resistive strip between the wiper and the second end of the resistive strip is maintained at essentially zero so that the voltage at the input to the buffer represents the voltage of the resistive strip at its contact with the wiper.

The output signals from the sensor voltage detector, second voltage detector, as well as a third voltage detector providing an output signal representative of the voltage at the first end of the resistive strip are connected as input signals to the ECU. By then applying standard Kirchoff calculations, the ECU can determine the contact resistance between the wiper and the resistive strip. In the event that contact resistance falls outside a predetermined acceptable range, the ECU can generate the appropriate correction signal to the throttle position sensor to achieve the desired signal representing the actual position of the throttle plate.

In a further enhancement to the invention, the present invention includes circuitry for determining the total resistance between the wiper and the first end of the resistive strip, as well as between the wiper and the second end of the resistive strip. Tracking of the total resistance for the resistive strip over a long period of time is indicative of a local gradient change due to mechanical wearing of the resistive strip and/or the wiper.

In the preferred embodiment of the invention, a two-position switch is connected in series with the first end of the resistive strip and a three-position switch is connected in series with the second end of the resistive strip. A two-position switch is also connected in series between the wiper and a sensor resistor.

The ECU controls the activation of the first, second and third switches to selectively connect a high voltage potential, a low voltage potential or an open circuit to the end of the resistive strip, and selectively electrically connect the sensor resistor in series to the wiper. Thereafter, the measurement of the resistance of the resistive strip both along its upper portion, i.e. between the wiper and the first end of the resistive strip, and its lower portion or between the wiper and the second end of the resistive strip, may be easily determined by the ECU.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
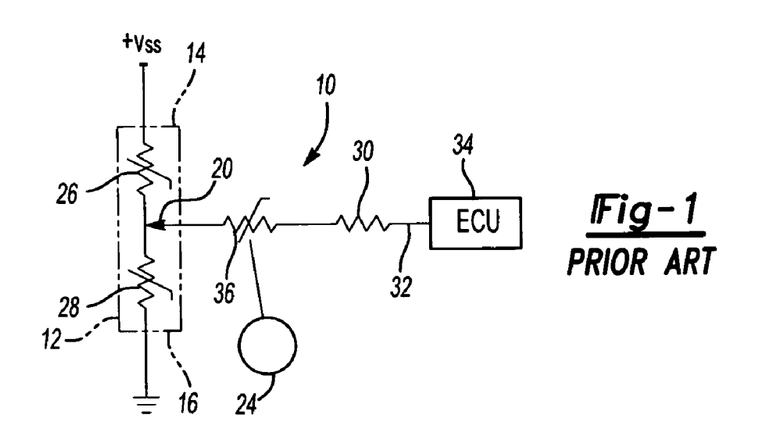
FIG. 1 is a circuit diagram illustrating a typical throttle position sensor for an electronic throttle.

With reference first to FIG. 1, a simplified schematic view of a prior art throttle position sensor 10 is illustrated. The sensor 10 includes an elongated resistive strip 12 having a first end 14 and a second end 16. The first end 14 of the resistive strip 12 is connected to a first voltage potential $V_{ref}$ while the second end 16 of the resistive strip 12 is connected to a second and different voltage potential, typically ground.

Although the resistive strip 12 is illustrated in FIG. 1 as being linear in shape, more typically the resistive strip 12 is arranged in a circular pattern.

Still referring to FIG. 1, a wiper 20 is in sliding contact with the resistive strip 12. The wiper 20, furthermore, is mechanically connected to a movable throttle element 24, such as a throttle plate. Consequently, the position of the wiper 20 along the strip 12 varies proportionately with the degree of opening of the throttle element 24.

The electrical resistance between the wiper 20 and the first end 14 of the resistive strip 12 is represented by an upper resistor 26 which, of course, varies in value depending upon the position of the wiper 20. Similarly, the resistance between the wiper 20 and the second end 16 is illustrated in FIG. 1 as a lower resistor 28. The value of the upper resistor 26 as well as the value of the lower resistor 28, of course, will vary inversely with respect to each other as a function of the position of the wiper 20 along the strip 12.

The wiper 20 is, in turn, connected through an output resistor 30 of a predetermined fixed value to a terminal 32. This terminal 32, in turn, is connected as an input signal to an electronic control unit (ECU) 34 for the internal combustion engine. In the conventional fashion, the ECU 34 controls not only the activation of the electronic throttle, but also the other engine operating components.

The magnitude of the output signal at terminal 32 from the throttle position sensor 10 varies in dependence upon the position of the wiper 20 relative to the strip 12. Furthermore, since the wiper 20 mechanically contacts the resistive strip 12, the throttle position sensor 10 exhibits a contact resistance between the wiper 20 and the resistive strip 12. This contact resistance is indicated diagrammatically by a resistor 36 in FIG. 1.

Since the resistance of the output resistor 32, as well as the resistance of the resistive strip 12 is predetermined, as long as the contact resistance 36 maintains within predetermined limits, the output signal at terminal 32 from the throttle position sensor will remain substantially linear relative to the position of the wiper 20 along the resistive strip 12.

Damage to the resistive strip and/or wiper, as well as other malfunctions, however, can cause the contact resistance 36 to exceed acceptable limits.

Figure 2:
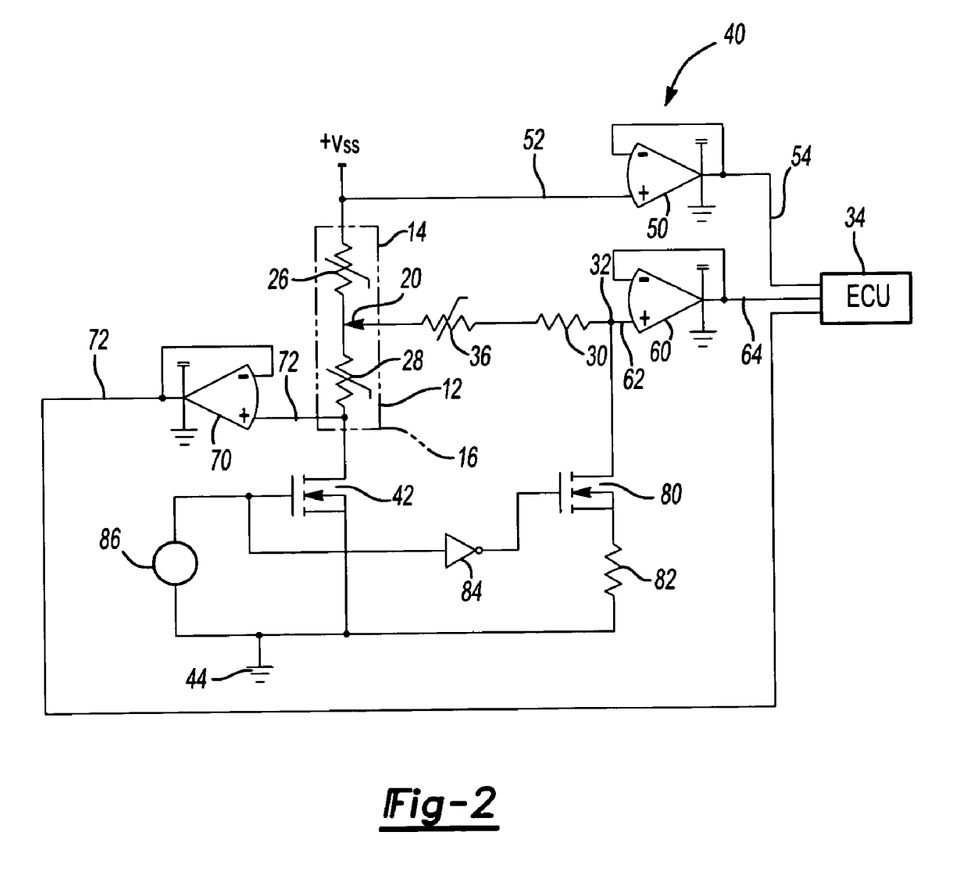
FIG. 2 is a schematic view of a preferred embodiment of the present invention.

With reference now to FIG. 2, a preferred embodiment of the throttle position sensor 40 of the present invention with circuitry which monitors the contact resistance is illustrated. The throttle position sensor 40, like the previously known throttle position sensors 10 (FIG. 1), includes the elongated strip 12 having a first end 14 and second end 16. The first end 14 is connected to a first voltage source $V_{ref}$ while the second end 16 of the strip 12 is selectively connected through a switch 42 to a second voltage potential 44, such as ground.

The throttle position sensor 40 further includes the output resistor 30 connected in series with the wiper 20. Consequently, the output terminal 32 from the throttle position sensor 40, assuming that the switch 42 is in a closed state, represents the position of the wiper 20 relative to the resistive strip 12.

A first voltage detector or buffer 50 having a high impedance input 52 is electrically connected to the first end 14 of the strip 12. As such, the buffer 50 provides a signal on its output 54 representative of the voltage potential $V_{ref}$. This buffer output 54 is electrically connected as an input signal to the ECU 34.

A second buffer 60 has a high impedance input 62 which is electrically connected with the output terminal 32 from the wiper 20. Consequently, the buffer 60 provides a signal on its output 64 representative of the voltage at the wiper terminal outlet 32.

A third buffer 70 has a high impedance input electrically connected to the second end 16 of the strip 12. Consequently, the buffer input 72 is electrically connected between the resistive strip end 16 and the switch 42. The buffer 72 provides a signal at its output 72 which varies in a fashion to be subsequently described. This output 72 is electrically connected as an input signal to the ECU 34.

Still referring to FIG. 2, a second electronic switch 80 together with a sensor resistor 82 having a predetermined fixed value are connected in series between the output terminal 32 from the wiper 20 and the second voltage potential 44. Furthermore, both the electronic switches 42 and 80 are preferably FET transistors although any type of conventional switch may be alternatively used. Additionally, the input from the switch 42 is electrically connected to the input for the switch 80 by an inverter 84 so that, when the switch 42 is closed, the switch 80 is open, and vice versa.

Any conventional means may be used to selectively activate the switches 42 and 80 between their open and closed positions. For example, as illustrated in FIG. 2, a wave generator 86, such as a square wave generator, is electrically connected to the input of the switch 42. The output from the square wave generator 86, furthermore, is electrically connected to the ECU 34 so that the ECU 34 monitors the state of the switches 42 and 80. Alternatively, however, the ECU 34 may have an output signal directly connected as an input to the input for the switch 42 such that the ECU 34 controls the activation of the switches 42 and 80.

In operation, assuming that the switch 42 is closed, and consequently the switch 80 open, the throttle position sensor 40 operates in the normal fashion. The second end 16 is electrically connected to the second voltage potential 44, typically ground, in the same fashion as the prior art throttle position sensor (FIG. 2). The only difference is that the output terminal 32 from the wiper 20 is isolated from the ECU 34 by the buffer 60.

Conversely, when it is desired to measure the contact resistance 36, the switch 42 is activated to an open position which simultaneously closes the switch 80. With the switch 42 in an open position, the high impedance input 72 of the buffer 70 is electrically connected in series with the second end 16 of the resistive strip 12. In doing so, the current through the lower resistor 28 is essentially zero so that the voltage level at the buffer input 72 equals the voltage potential at the point of contact between the wiper 20 and the resistive strip 12. This output signal $V_{rtn}$ represents the voltage at the junction of the wiper 20 with the strip 12.

Simultaneously, since the switch 80 is in a closed position, current flows not only through the output resistor 30, but also through the sensor resistor 82. Both the resistance of the output resistor 30 as well as the sensor resistor 82 are known. Furthermore, the voltage at the output terminal 32 from the wiper 20, i.e. the voltage drop across the sensor resistor 82, is electrically connected as an output signal $V_{sig}$ to the ECU. Simultaneously, the voltage at the first end 14 of the resistive strip 12 is provided by the buffer 50 as a reference voltage $V_{ref}$ to the ECU 34.

Since the resistance of both the output resistor 30 as well as the sensor resistor 82 is known, the contact resistance $R_{cr}$ of the contact resistor 36 may be determined using standard Kirchoff equation as follows:

$$R_{cr}=(V_{rtn}-V_{sig})/(V_{sig}/R_{sens})-R_{serie} \qquad (1)$$

Likewise, the resistance $R_{up}$ of the upper resistance 26 may be determined in accordance with the following equation:

$$R_{up}=(V_{ref}-V_{rtn})/(V_{sig}/R_{sens}) \qquad (2)$$

Following determination of the contact resistance $R_{cr}$ by the ECU, the state of the switches 42 and 80 is reversed whereupon the output signal $V_{sig}$ is inputted by the ECU 34.

Assuming proper operation of the sensor 10, the contact resistance $R_{cr}$ of the contact resistor 36 will fall within a predetermined and relatively small range. A determination that the contact resistance $R_{cr}$ of the contact resistor 36 falls outside this range constitutes an indication of an error in the output signal from the throttle position sensor 40.

Figure 3:
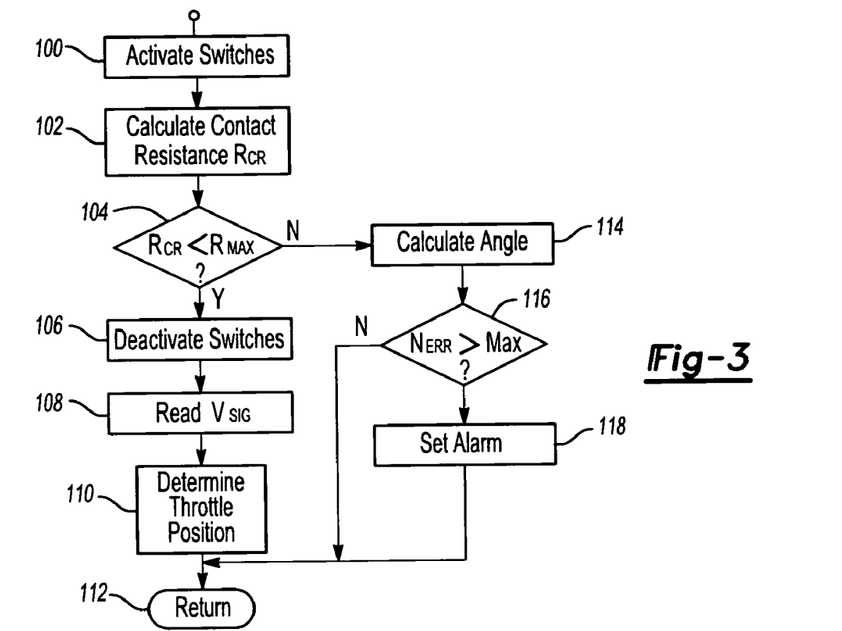
FIG. 3 is a schematic view illustrating a modification of the present invention.

With reference now to FIG. 3, a flowchart representing the operation of the throttle position sensor of the present invention is illustrated. At step 100, the switches 42 and 80 are activated, i.e. the switch 42 is open and the switch 80 is closed. Step 100 then branches to step 102.

At step 102, the ECU 34 calculates the contact resistance $R_{cr}$ using Equation (1) above. Step 102 then branches to step 104.

At step 104, the ECU determines whether or not the contact resistance $R_{cr}$ exceeds a predetermined maximum $R_{max}$. If not, indicative of an acceptable operating condition, step 104 branches to step 106 which deactivates or inverts the switches 42 and 80 thus returning the throttle position sensor 40 to its operational mode. Step 106 then branches to step 108.

At step 108 the ECU reads the output signal $V_{sig}$ from the wiper terminal 32. Step 108 then branches to step 110 where the throttle position is calculated and then returns at step 112.

Conversely, in the event that the contact resistance $R_{cr}$ exceeds the predetermined maximum $R_{max}$, indicative of a malfunction of the throttle position sensor 40, step 104 branches to step 114. As step 114, the ECU 34 uses prediction algorithms to estimate the real throttle opening by using previously acquired data directly and/or extrapolation to estimate the current throttle angle. The prediction algorithms could be either flat extrapolation or first order linear extrapolation to estimate the throttle position at the coming time step. An even further complicated estimate method using more previous time step information could also be one of the choices. Such prediction algorithms are well known in the art so that a further description thereof is unnecessary. Step 114 then branches to step 116.

At step 116, the ECU determines the number $N_{err}$ of successive error signals from the throttle position sensor 40. In the event that the number of consecutive errors is less than a predetermined number $N_{max}$, indicative that the error is merely a transient error, step 116 branches to step 112 and the normal operation of the throttle position sensor continues.

Conversely, in the event that the error condition from the throttle position sensor exceeds a predetermined number $N_{max}$ of consecutive signals, such condition is indicative that a permanent error condition from the throttle position sensor exists. In this case, step 116 branches to step 118 where the ECU sets an alarm condition for the vehicle. Step 118 then returns through step 112.

Many throttle position sensors contain redundant circuitry and, specifically, a redundant resistive strip 12 and wiper 20. Consequently, in the event that the error condition exceeds the predetermined number $N_{max}$ at step 116, step 116 may alternatively switch the outputs from the throttle position sensor to the redundant throttle position sensor circuitry.

From the foregoing, it can be seen that the present invention provides a simple, and yet highly effective means for measuring the contact resistance $R_{cr}$ of the contact resistor 36 for the throttle position sensor 40 in an iterative fashion. Preferably, the contact resistance $R_{cr}$ is determined immediately before each reading of the sensor 10 by the ECU 34. In the event of a temporary or transient error in the output signal from the throttle position sensor 40, prediction algorithms are used to estimate the actual position of the throttle. Conversely, prolonged consecutive error signals from the throttle position sensor, indicative of a component failure, will result in the appropriate alarm system for the operator of the vehicle.

In some instances, the total resistance of both the upper resistor 26 (FIG. 2) and the lower resistor 28 provides an indication as to whether there exists a local gradient change due to mechanical wear of the resistive strip 12. A local gradient change due to wear of the resistive strip 12 can also result in false readings from the throttle position sensor 40.

Figure 4:
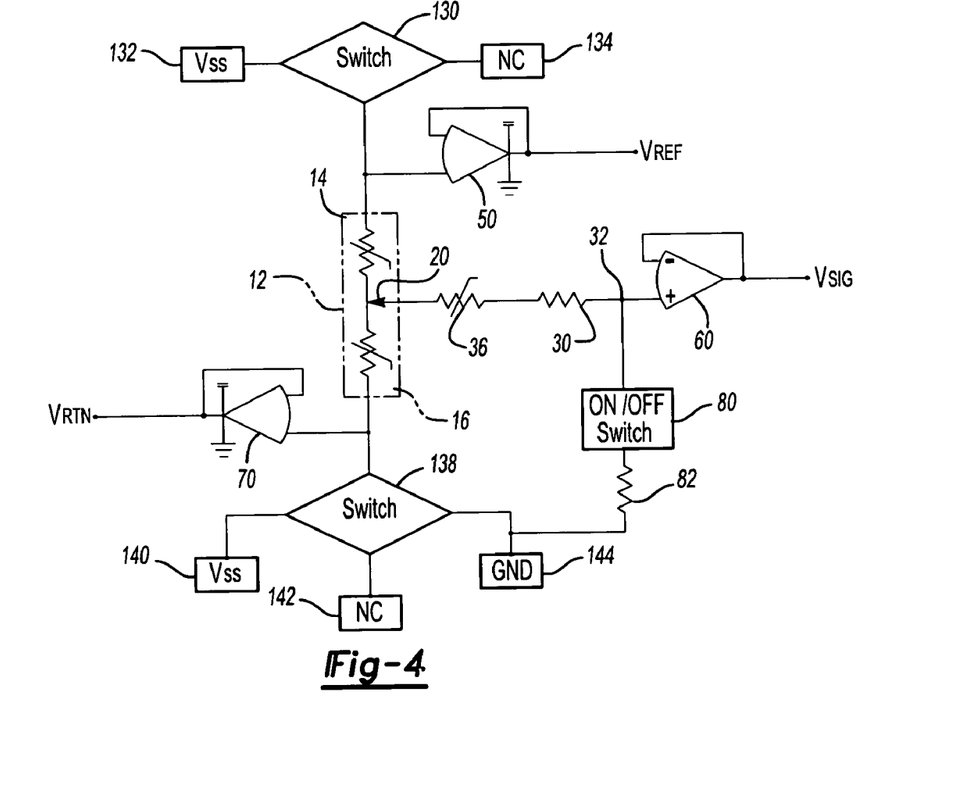
FIG. 4 is a flowchart illustrating the operation of the preferred embodiment of the present invention.

With reference now to FIG. 4, a circuit for determining the resistance of both the upper resistor 26 as well as the lower resistor 28 of the resistive strip 12 is illustrated. In FIG. 4, a first electronic switch 130 selectively electrically connects the upper or first end 14 of the resistive strip 12 to either the preset voltage source $V_{ref}$ or to an open connection NC 134. The buffer 50 provides its output signal $V_{ref}$ representative of the voltage at the upper end 14 of the resistive strip 12.

A three-position switch 138 is connected in series with the lower end 16 of the resistive strip 12. This three-position switch 138 selectively connects the resistive strip end 16 to either the voltage source $V_{ref}$, an open condition NC 142 or to a voltage potential 144, such as ground, different than the voltage potential $V_{ref}$.

As before, the switch 80 selectively electrically connects the sensor resistor 82 having resistance $R_{sen}$ in series between the voltage potential 144 and the output terminal 32 from the wiper 20.

The resistance $R_{up}$ of the upper resistor 26 as well as the resistance $R_{low}$ of the lower resistor 28 is then determined by activating the switches 130, 138 and 80 in accordance with the following table:

TABLE 1

| Operation Mode | Switch 130 | Switch 138 | Switch 80 |
|---|---|---|---|
| Normal TPS measurement mode | $V_{ref}$ | GND | open |
| $R_{up} + R_{cr}$ | $V_{ref}$ | NC | closed |
| $R_{low} + R_{cr}$ | NC | $V_{ref}$ | closed | where:

$$R_{up} + R_{cr} = (V_{ref} - V_{rtn})/(V_{sig}/V_{sen})$$

$$R_{low} + R_{cr} = (V_{rtn} - V_{ref})/(V_{sig}/V_{sen})$$

By periodically determining the resistance $R_{up}$ and $R_{low}$, any long-term changes in the overall resistance of the resistive strip 12 may be monitored by the ECU 34. When appropriate, the ECU 34 can generate the appropriate warning signals to the engine operator when the resistance of the resistive strip 12 falls outside acceptable threshold levels.

Figure 5:
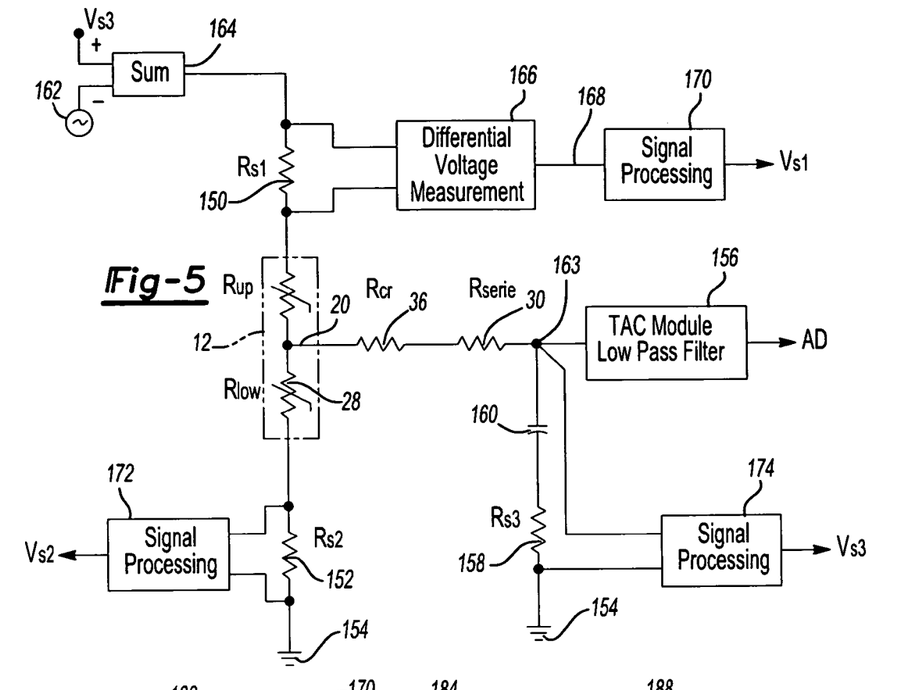
FIG. 5 is a circuit diagram illustrating a still further modification of the present invention.
Figure 6:
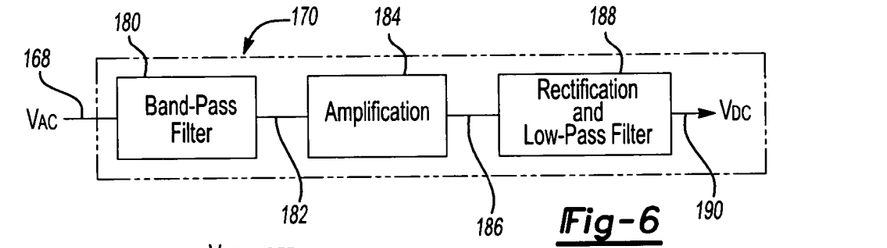
FIG. 6 is a circuit diagram of the signal processing block of FIG. 5.
Figure 7:
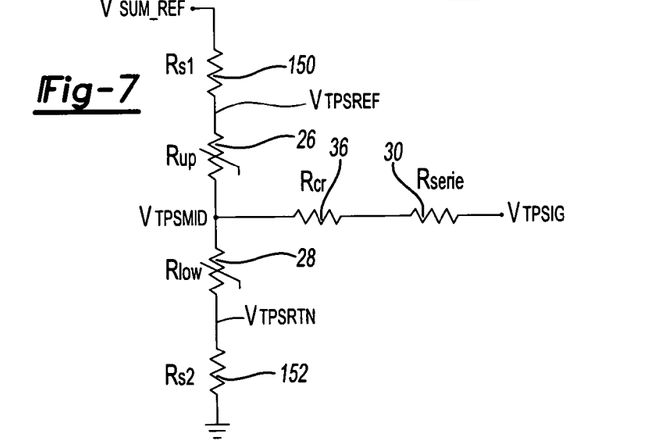
FIG. 7 is a simplified circuit diagram illustrating the high frequency impedances of FIG. 5.

With reference now to FIGS. 5–7, a modification of the present invention is shown for measuring the contact resistance $R_{cr}$ between the wiper 20 and the resistive strip 12. As before, the wiper 20 divides the resistive strip 12 into an upper resistor 26 having a resistance $R_{up}$ and a lower resistor 28 having a resistance $R_{low}$. The actual value of the resistances $R_{up}$ and $R_{low}$ vary, of course, in dependence upon the position of the wiper 20 along the resistive strip 12.

As best shown in FIG. 5, a first sensor resistor 150 having a fixed resistance $R_{s1}$ is connected in series with the upper resistor 26. Similarly, a second sensor resistor 152 having a fixed resistance $R_{s2}$ is connected in series between the lower resistor 28 and ground 154.

Still referring to FIG. 5, the resistor 36 represents the contact resistance having a resistance $R_{cr}$ between the wiper 20 and the resistive strip 12. The output resistor 30 having a fixed resistance $R_{series}$ is connected in series with the wiper 20, and thus in series with the contact resistance 36. The resistor 30, as before, forms the output signal to the ECU (not illustrated in FIG. 5) through a low pass filter 156.

A third sensor resistor 158 having a fixed resistance $R_{s3}$ is connected in series with a capacitor 160 between an output node 163 of the resistor 30 and ground 154. As will become shortly apparent, the capacitor 160 serves to block direct current from the output node 163 to ground 154 through the third sensor resistor 158 while simultaneously permitting alternating current to pass through the capacitor 160 and third sensor resistor 158.

A high frequency alternating current frequency source 162 is connected together with the reference voltage $V_{ss}$ through a summing junction 164 to the first sensor resistor 150. Consequently, the voltage signal applied to the resistive strip 12 through the first sensor resistor 150 comprises the sum of the reference voltage source $V_{ss}$ and the output signal from the alternating current source 162.

A differential voltage sensor 166 is connected across the first sensor resistor 150 and provides a signal at its output 168 of the differential voltage across the resistor 150. Consequently, the output on signal 168 is representative of the voltage differential across the first sensor resistor 150 attributable to the AC signal source 162. Furthermore, this output 168 is coupled as an input signal to a signal processor circuit 170.

Still referring to FIG. 5, a second signal processor 172 is electrically connected across the second sensor resistor 152 while a third signal processor 174 is electrically connected across the capacitor 160 and third sensor resistor 158 series combination.

All three signal processors 170, 172 and 174 are substantially identical to each other so that only one signal processor 170 will be described in detail, it being understood that a like description shall also apply to the other signal processors 172 and 174.

With reference now to FIG. 6, the signal processor 170 is there shown in greater detail and comprises a band pass filter 180 connected in series with the output 168 from the differential voltage detector 166. This band pass filter 180 has a predetermined band pass frequency range. Furthermore, the band pass frequency range of the band pass filter 180 is selected so that the frequency of the AC signal source 162 is within that preset band pass range. Consequently, an output 182 from the band pass filter 180 corresponds to the voltage differential across the first sensor resistor 150 attributable to the signal from the AC signal source 162.

The output 182 from the band pass filter 180 is coupled as an input signal to an amplifier 184 having its output 186 connected as an input signal to a rectification and low pass filter circuit 188. Consequently, the signal on an output 190 from the rectification and low pass filter circuit 188 comprises a DC voltage output signal having a magnitude corresponding to the voltage drop across the first sensor resistor 150 attributable to the signal from the AC signal source 162.

The signal processing circuits 172 and 174 work in an identical fashion to the signal processing circuit 170. However, it is unnecessary to include a differential voltage detector 166 in combination with either the signal processing circuit 172 or 174 since both the second sensor resistor 152 and third sensor resistor 158 are connected to ground. Consequently, the output signal $V_{s2}$ from the second signal processor 172 corresponds to the voltage differential across the second sensor resistor 152 attributable to the AC signal source 162 while, similarly, the output signal $V_{s3}$ from the second signal processor 174 corresponds to the voltage differential across the third sensor resistor 158 attributable to the AC signal source 162.

It will be understood, of course, that the signal processor 170 illustrated in FIG. 6 is by way of illustration only. Other data acquisition equipment capable of measuring the magnitude of the AC signal may alternatively be used without deviation from either the spirit or scope of the invention.

Referring again to FIG. 5, the capacitor 160 effectively blocks the DC signal from the throttle position sensor from passing through the third sensor resistor 158. However, the capacitor 160 is selected such that it conducts an AC signal corresponding in frequency to the frequency of the AC signal source 162.

With reference now to FIG. 7, a simplified resistor network is illustrated based upon the AC signal amplitude of the various voltage nodes. Furthermore, the following amplitudes of the AC signals are measurable and, therefore, known:

(1) $V_{SUM\_REF}$
(2) $V_{s1} = V_{SUM\_REF} - V_{TPSREF}$
(3) $V_{TPSRTN} = V_{s2}$
(4) $V_{TPSSIG} = V_{s3}$

Furthermore, the following resistances in the network illustrated in FIG. 7 are also known:

| | |
|---|---|
| $R_{s1}$ | Resistor 150 |
| $R_{s2}$ | Resistor 152 |
| $R_{serie}$ | Resistor 30 |
| $R_{TPS} = R_{up} + R_{low}$ | Resistors 26 and 28 |

Then, by application of standard Kirchoff equations generates the following four independent equations:

$V_{TPSREF} - V_{TPSMID} = R_{up} * (V_{s1}/R_1)$ $V_{TPSMID} - V_{TPSRTN} = R_{low} * (V_{s2}/R_{s2})$ $V_{TPSMID} - V_{TPSSIG} = (R_{cr} + R_{serie}) * (V_{s1}/R_{s1} - V_{s2}/R_{s2})$ $R_{TPS} = R_{up} + R_{low}$ Since the above four equations are independent of each other and contain four unknown values, including the value $R_{cr}$ of the contact resistance 36, the ECU, through conventional programming algorithms, solves the value of the resistance $R_{cr}$ of the contact resistance 36.

A primary advantage of utilizing the modification of the invention illustrated in FIGS. 5–7 is that the contact resistance $R_{cr}$ of the wiper 20 may be determined in a non-intrusive fashion and simultaneously with the normal operation of the throttle position sensor. As such, unlike the embodiments of the invention illustrated in FIGS. 1–4, it is unnecessary to devote a time slice of the ECU in order to determine the contact resistance $R_{cr}$.

From the foregoing, it can be seen that the present invention provides a simple and yet high effective mechanism for monitoring both the contact resistance as well as the overall resistance of the resistive strip during operation of the throttle position sensor. Short-term or transient errors from the throttle position sensor may be easily corrected by the ECU using prediction algorithms. Conversely, long-term errors will likewise be detected and appropriate warning signals provided to the operator.

Having described our invention, however, many modifications thereto will become apparent to those skilled in the art to which it pertains without deviation from the spirit of the invention as defined by the scope of the appended claims.

We claim:

1. A throttle position sensor for a throttle having a movable throttle element comprising:

an elongated electrically resistive strip having a first end and a second end, said first end being electrically connected to a first voltage potential and said second end being electrically connected to a second voltage potential, said first voltage potential being different than said second voltage potential, an electrically conductive wiper in sliding contact with said resistive strip, one of said wiper or said resistive strip being coupled to the movable throttle element so that the position of said wiper relative to said strip varies proportionately with the position of the throttle element and so that a voltage at an output from said wiper varies proportionately with the position of the movable throttle element, and a circuit which determines a contact resistance between said wiper and said strip, wherein said circuit comprises:

a sensor resistor of predetermined resistance, a switch which selectively electrically connects said sensor resistor between said wiper and said second voltage potential, a first voltage detector which generates an output signal representative of the voltage drop across said sensor resistor, a second voltage detector which generates an output signal representative of the voltage drop between said first end of said strip and said wiper, and a processor electrically connected to the output signals from said first and second voltage detectors and said first voltage potential which calculates the contact resistance as a function of said first and second voltage detector output signals and said first voltage potential.

2. The invention as defined in claim 1 wherein said second voltage detector comprises a buffer having high impedance input selectively electrically connected in series with said second end of said strip, said second voltage detector having an output signal proportional to the voltage on said strip at the point of contact with said wiper.

3. The invention as defined in claim 1 wherein said first voltage detector comprises a buffer having high impedance input selectively electrically connected in parallel with said sensor resistor, said buffer having an output signal representative of the voltage drop across said sensor resistor.

4. The invention as defined in claim 2 and comprising a second switch for selectively electrically connecting said buffer input in series with said second end of said strip, said second switch having one pole connected to said second end of said strip and a second pole connected to said second voltage potential.

5. The invention as defined in claim 4 wherein said first mentioned switch comprises an electronic switch.

6. The invention as defined in claim 5 wherein said electronic switch comprises a FET.

7. The invention as defined in claim 4 wherein said second switch comprises an electronic switch.

8. The invention as defined in claim 7 wherein said electronic switch comprises a FET.

9. The invention as defined in claim 1 and comprising a buffer having high impedance input selectively electrically connected in parallel with said first end of said strip, said buffer generating an output signal representative of said first voltage potential.

10. The invention as defined in claim 1 wherein said processor comprises a microprocessor.

11. The invention as defined in claim 10 wherein said microprocessor compares said calculated contact resistance and generates an error signal when said calculated contact resistance exceeds a predetermined threshold.

12. The invention as defined in claim 11 wherein, in response to said error signal and said output voltage from said wiper, said microprocessor calculates a corrected throttle position sensor output signal.

13. The invention as defined in claim 11 wherein said throttle position sensor includes a redundant resistive strip and a redundant wiper and wherein, in response to said error signal, said circuit switches said outputs from said throttle position sensor to said redundant resistive strip and said redundant wiper.

14. The invention as defined in claim 1 and comprising a second circuit which selectively measures the resistance between said second end of said strip and said wiper.

15. The invention as defined in claim 14 wherein said second circuit comprises a first switch which selectively connects said first end of said strip to said first voltage potential, a second switch which selectively electrically connects said second end of said strip to said first voltage potential, said second voltage and an open circuit.

16. A method for use with a throttle position sensor having an elongated resistive strip with a first and second end, a wiper in sliding contact with said strip, said wiper exhibiting a contact resistance with the strip, for determining the contact resistance comprising the steps of:
applying a voltage to the first end of the strip,
detecting the voltage at said first end of said strip,
connecting a resistor of predetermined resistance to said wiper,
detecting the voltage drop across the resistor, and
detecting the voltage at the contact between the wiper and the strip.

17. The invention as defined in claim 16 wherein said step of detecting the voltage at the contact between the wiper and the strip comprises the step of minimizing current flow along the strip between the wiper and the second end of the strip, and detecting the voltage at the second end of the strip.

18. The invention as defined in claim 17 wherein said minimizing step comprises the step of electrically connecting a high impedance electrical device in series with the second end of the strip.

19. The invention as defined in claim 18 and further comprising the step of compensating for a contact resistance outside a preset range.

20. A method for monitoring the operational status of a throttle position sensor having an elongated resistive strip having two ends and a wiper in sliding contact with the strip and exhibiting a contact resistance, a voltage potential applied between the ends of the strip so that the voltage at the wiper corresponds to the position of the wiper along the strip, said monitoring method comprising the steps of:
iteratively determining the resistance between the wiper and each end of the strip,
comparing said iteratively determined resistance values with previously stored resistance value, and
generating a warning signal when said comparing step identifies a resistance difference greater than a predetermined threshold.

21. A throttle position sensor for a throttle having a movable throttle element comprising:
an elongated electrically resistive strip having a first end and a second end, said first end being electrically connected to a first voltage potential and said second end being electrically connected to a second voltage potential, said first voltage potential being different than said second voltage potential,
an electrically conductive wiper in sliding contact with said resistive strip, one of said wiper or said resistive strip being coupled to the movable throttle element so that the position of said wiper relative to said strip varies proportionately with the position of the throttle element and so that a voltage at an output from said wiper varies proportionately with the position of the movable throttle element, and
a circuit which determines a contact resistance between said wiper and said strip, wherein said circuit comprises:
a first sensor resistor connected in series with said first end of said resistive strip,
a second sensor resistor connected in series with the second end of said resistive strip,
a third sensor resistor connected to said wiper,
an alternating current source connected to said first end of said resistive strip,
circuitry which detects a voltage differential across said first, second and third sensor resistors attributable to said alternating current source and generates output signals representative of said voltage differentials, and
a processor which determines said contact resistance as a function of said output signals.

22. The invention as defined in claim 21 and comprising a DC blocking capacitor connected in series with said third sensor resistor.

23. The invention as defined in claim 21 wherein said circuitry comprises a signal processor associated with each of said sensor resistors for isolating the voltage differential across each sensor transistor attributable to said alternating current source.

24. The invention as defined in claim 23 wherein each signal processor comprises a band pass filter having a predetermined band pass frequency range, said alternating frequency signal source having a frequency within said band pass frequency range.

25. The invention as defined in claim 24 wherein each said signal processor comprises a rectifier connected in series with an output from said band pass filter.

26. The invention as defined in claim 25 and comprising an amplifier connected in series with each said rectifier.

* * * * *